United States Patent
Ulrey et al.

(10) Patent No.: US 8,997,707 B2
(45) Date of Patent: Apr. 7, 2015

(54) VEHICLE FUEL BURNER

(76) Inventors: Joseph Norman Ulrey, Dearborn, MI (US); Ross Dykstra Pursifull, Dearborn, MI (US)

( * ) Notice: Subject to any disclaimer, the term of this patent is extended or adjusted under 35 U.S.C. 154(b) by 211 days.

(21) Appl. No.: 13/035,688

(22) Filed: Feb. 25, 2011

(65) Prior Publication Data

US 2012/0216767 A1 Aug. 30, 2012

(51) Int. Cl.
  *B60H 1/03* (2006.01)
  *B60H 1/14* (2006.01)
  *B60H 1/00* (2006.01)

(52) U.S. Cl.
  CPC .............. *B60H 1/14* (2013.01); *B60H 1/00778* (2013.01)

(58) Field of Classification Search
  USPC ............. 123/142.5 R, 568.12, 568.2, 568.14, 123/568.15, 550; 237/2 A, 12.3 C; 60/605.2; 701/108
  See application file for complete search history.

(56) References Cited

U.S. PATENT DOCUMENTS

| | | | |
|---|---|---|---|
| 4,836,445 A * | 6/1989 | Okada | 237/2 A |
| 4,858,825 A * | 8/1989 | Kawamura | 237/2 A |
| 5,192,021 A | 3/1993 | Meier et al. | |
| 5,678,461 A | 10/1997 | Stine | |
| 6,021,868 A | 2/2000 | Bogema | |
| 6,131,553 A | 10/2000 | Suzuki | |
| 6,276,334 B1 * | 8/2001 | Flynn et al. | 123/435 |
| 6,360,702 B1 | 3/2002 | Osada | |
| 6,412,617 B1 | 7/2002 | Spijker et al. | |
| 6,537,178 B1 | 3/2003 | Takizawa et al. | |
| 6,571,779 B2 * | 6/2003 | Suzuki | 123/550 |
| 6,695,743 B2 | 2/2004 | Tanaka et al. | |
| 6,732,522 B2 * | 5/2004 | Wright et al. | 60/602 |
| 6,868,668 B2 | 3/2005 | Suzuki | |
| 7,213,585 B2 * | 5/2007 | Yang | 123/543 |
| RE40,286 E * | 5/2008 | Biess et al. | 123/142.5 R |
| 2003/0010022 A1 * | 1/2003 | Suzuki | 60/286 |
| 2007/0144170 A1 * | 6/2007 | Griffith | 60/600 |
| 2007/0295475 A1 | 12/2007 | Samie et al. | |
| 2009/0194602 A1 * | 8/2009 | Martin et al. | 237/12.3 R |
| 2010/0000475 A1 | 1/2010 | Kardos et al. | |
| 2010/0197441 A1 | 8/2010 | Pursifull | |

OTHER PUBLICATIONS

Ulrey, Joseph Norman et al., "Method and System for Cabin Heating," U.S. Appl. No. 12/758,570, filed Apr. 12, 2010, 24 pages.
Ulrey, Joseph Norman et al., "Transmission Fluid Heating Via Heat Exchange With Engine Cylinder Walls," U.S. Appl. No. 12/892,548, filed Sep. 28, 2010, 29 pages.

* cited by examiner

*Primary Examiner* — Lindsay Low
*Assistant Examiner* — Omar Morales
(74) *Attorney, Agent, or Firm* — Julia Voutyras; Alleman Hall McCoy Russell & Tuttle LLP (57) ABSTRACT

A method is provided. The method includes, during stopped engine operation, burning fuel in an engine intake heater to generate heated gas, the heated gas bypassing engine cylinders via an exhaust gas recirculation passage. The method further includes during combusting engine operation, burning fuel in the engine intake heater to generate heated gas, and flowing the heated gas through combusting engine cylinders.

21 Claims, 5 Drawing Sheets

VEHICLE FUEL BURNER

BACKGROUND/SUMMARY

Vehicle heating systems, such as cabin climate control systems, often rely on waste engine heat as a heat source. However, under some conditions there may be insufficient waste engine heat, thus leading to customer discomfort. As a result, fuel burning heaters have been used to generate heat that can be provided to the climate control system of the vehicle. One such example is described in U.S. Pat. No. 6,131,553 in which a combustion heater is positioned in an engine intake system. The heater may include a coolant passage traveling therethrough. The coolant passage may be configured to flow coolant through the combustion heater to a car room heater.

Rather than the above approaches, various approaches are proposed to improve system performance by coordinating the fuel burning heater operation with engine operation in an interactive system. For example, one approach includes a method, comprising: during stopped engine operation, burning fuel in an engine intake heater to generate heated gas, the heated gas bypassing engine cylinders via an exhaust gas recirculation passage; and during combusting engine operation, burning fuel in the engine intake heater to generate heated gas, and flowing the heated gas through combusting engine cylinders.

In this way, it is possible to transfer heat from the heater's heated gas (e.g., to a climate control system) while also taking advantage of the engine's exhaust gas recirculation ducting to transport the heated gas to the exhaust. As one example, the heated gas can take advantage of intake air system heat-exchangers, such as intercoolers and/or exhaust gas recirculation cooler, already present for cooling boosted intake air or exhaust gas recirculation gasses during engine operation. Thus, during engine off conditions, the intercooler and/or EGR cooler, along with the EGR passage, enable the system to not only transfer heat to the engine coolant and thus the cabin, but also provide the gas handling system itself.

Further still, such operation re-uses any remaining heat in the heated gas to maintain temperature of emission control devices in the engine exhaust, which can reduce emissions on subsequent engine starts.

Additionally, when the engine is combusting, but still cold, the heater's heated gas can not only transfer heat to the climate control system, it can also be used to increase the intake air temperature fed to the combustion cylinder thus improving engine combustion stability and fuel economy, particularly at cold ambient temperatures.

Further, this ability to heat an emission control device such as a catalyst with fuel and air combusted in the intake system without the heated gas passing through the engine enables initial emission control device (e.g., catalyst) heating to be performed with or without the engine running. One benefit that this yields is that the engine may be used an effective vacuum source for various vehicle operations such as brake boost even during a cold engine start.

As another example, a vehicle is provided. The vehicle includes a fuel burner positioned in an intake system and a heat-exchanger positioned downstream of the fuel burner. The vehicle also includes an exhaust gas recirculation (EGR) passage fluidly coupling the intake system to an exhaust system and a control system configured to initiate generation of heated gas in the fuel burner and flow the heated gas to the heat-exchanger and through the EGR passage to the exhaust system. It will be appreciated that a pressure gradient may be generated to flow the heated gas to the heat exchanger. The pressure gradient may be generated via a blower fan included in the vehicle, the blower fan having an outlet positioned in the intake system upstream of the fuel burner. Alternatively, or additionally, the pressure gradient may be generated through pulsing of the fuel burner, where the pulsing of the fuel burner enables the system to act as a pulse jet engine.

Again, the above configuration can enable improved coordination between the fuel burner and the engine intake and exhaust ducting, thus enabling improved cabin climate control as well as improved engine performance.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
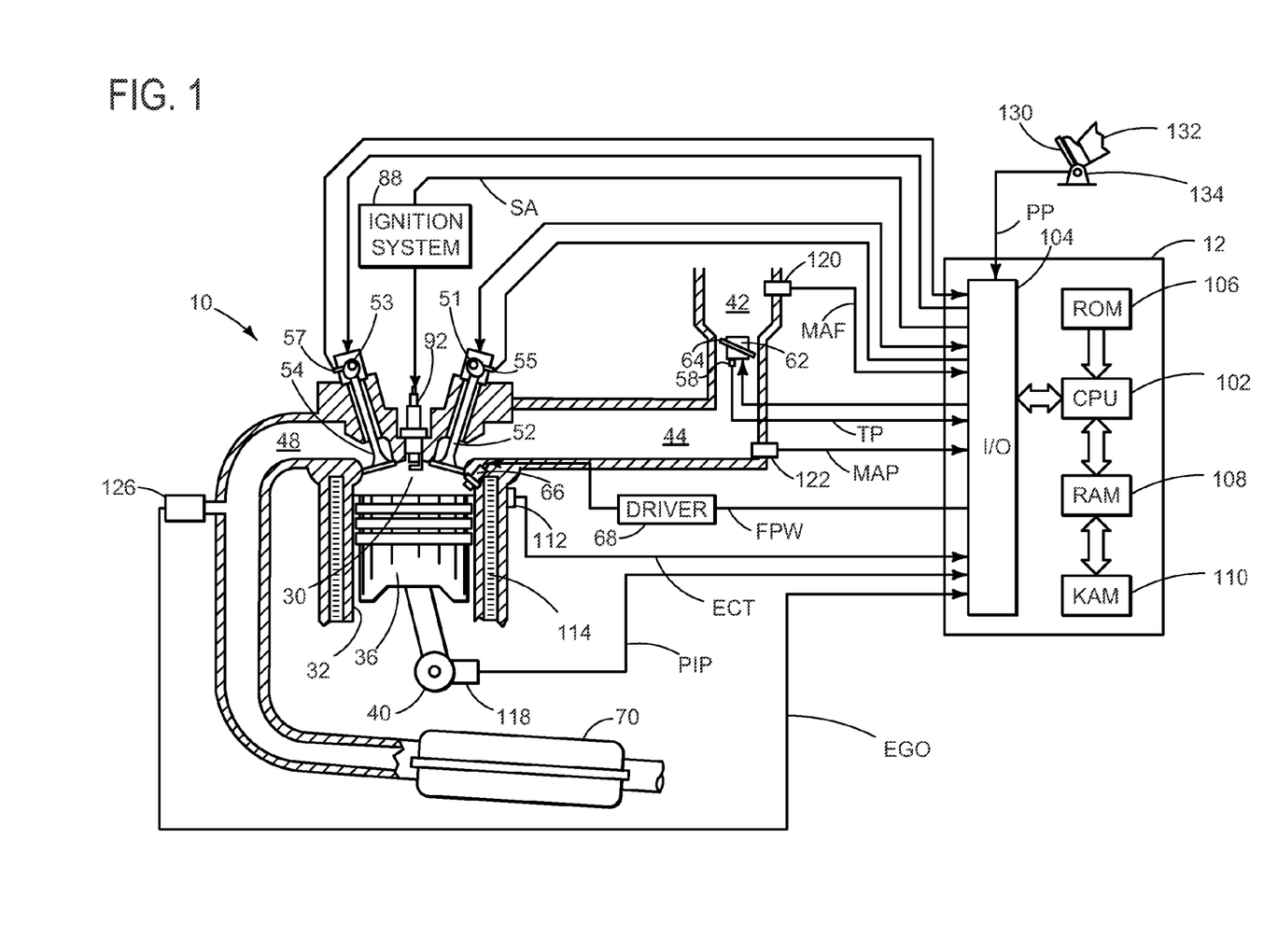
FIG. 1 shows a schematic depiction of an internal combustion engine.
Figure 3:
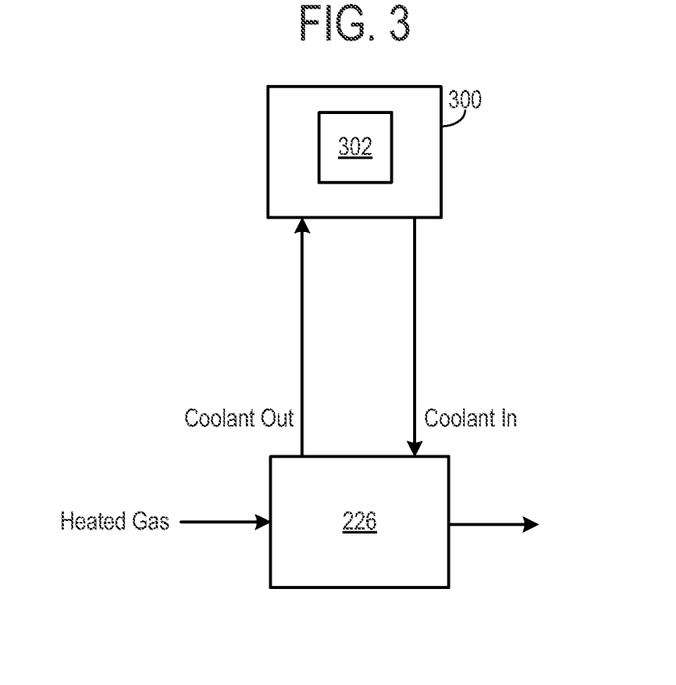
FIG. 3 shows a schematic depiction of the first heat-exchanger included in the vehicle shown in FIG. 2.

A vehicle having a fuel burner for generating heated gas and transferring the heat to various vehicle systems is disclosed herein. The fuel burner may be operated while the engine is running and while the engine is shut-down to provide a robust heat generation technique for a variety of systems within the vehicle such as a cabin climate control system and/or a powertrain lubrication system. In this way, heat may be efficiently generated via a fuel burner during a variety of operating conditions. Furthermore, the heat may be transferred to the vehicle system via existing heat-exchangers such as a first heat-exchanger positioned in an EGR conduit (which acts as an EGR cooler during warmed-up engine operation) and a second heat-exchanger positioned downstream of a compressor in an intake system (which acts as an intercooler during warmed-up/boosted engine operation). As such, it will be appreciated that the first heat-exchanger may also be configured to reduce the temperature of recirculated exhaust gas during periods of exhaust gas recirculation (EGR) operation. Likewise the second heat-exchanger may be configured to reduce the intake air temperature during periods of compressor operation. Thus, the first and second heat-exchangers may also be used as an EGR cooler and an intercooler, respectively, during certain operating conditions. This dual-use functionality of the heat-exchangers may reduce the manufacturing and repair cost of the vehicle. Further, Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57.

Intake manifold 44 is also shown intermediate of intake valve 52 and air intake zip tube 42. Fuel is delivered to fuel injector 66 by a fuel system (not shown) including a fuel tank, fuel pump, and fuel rail (not shown). The engine 10 of FIG. 1 may be configured such that the fuel is injected directly into the engine cylinder, which is known to those skilled in the art as direct injection. Fuel injector 66 is supplied operating current from driver 68 which responds to controller 12. Additionally or alternatively a port fuel injector may be included in the intake manifold 44, the port fuel injector may be configured to inject fuel into the intake manifold upstream of the intake valve 52. In addition, intake manifold 44 is shown communicating with optional electronic throttle 62 with throttle plate 64. In one example, a low pressure direct injection system may be used, where fuel pressure can be raised to approximately 20-30 bar. Alternatively, a high pressure, dual stage, fuel system may be used to generate higher fuel pressures.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by spark plug 92, resulting in combustion. However, in other examples compression ignition may be employed in the engine 10. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Figure 2:
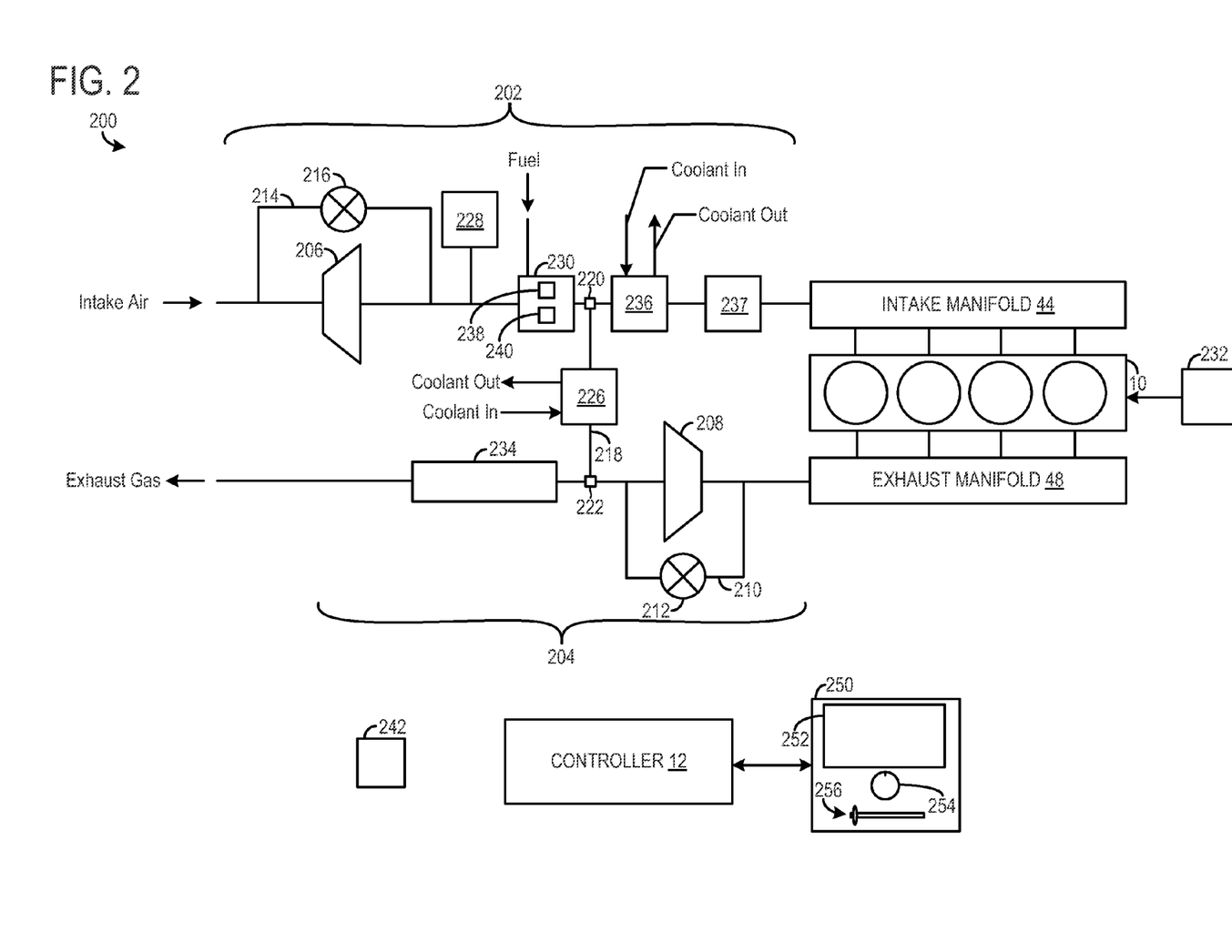
FIG. 2 shows a schematic depiction of a vehicle including the internal combustion engine shown in FIG. 1.

FIG. 2 shows a schematic depiction of a vehicle 200. Vehicle 200 includes the engine 10 as well as an intake system 202 and an exhaust system 204. The engine 10 is depicted as having 4 cylinders in FIG. 2. However, an alternate number of cylinders may be used in other embodiments. The intake system 202 may be configured to provide engine 10 with air for combustion and exhaust system 204 may be configured to flow exhaust gases away from engine 10. Vehicle 200 may further include a turbocharger having a compressor 206 positioned in the intake system 202 and a turbine 208 positioned in the exhaust system 204. A drive shaft (not shown) may couple the turbine 208 to the compressor 206. Exhaust gases may drive a rotor assembly in the turbine, thereby generating rotational energy. In turn, the rotational energy from the turbine may be transferred to the compressor via the drive shaft. The compressor may be configured to increase the pressure of intake air in the intake system. In this way boost may be provided to the engine. In other embodiment the turbocharger may not be included in the vehicle 200 or a supercharger including a compressor driven via an engine driveshaft may be utilized.

The vehicle 200 may also include a turbine bypass conduit 210 coupled upstream and downstream of the turbine. A turbine bypass valve 212 is disposed in the turbine bypass conduit 210. The engine 10 may further include a compressor bypass conduit 214 coupled upstream and downstream of the compressor 206. A compressor bypass valve 216 is disposed in the compressor bypass conduit 214. The turbine bypass valve 212 and the compressor bypass valve 216 may be operated to adjust the amount of boost provided to the engine. However, in other embodiments, the turbine bypass conduit 210 and corresponding turbine bypass valve, as well as the compressor bypass conduit 214 and corresponding compressor bypass valve 216, may not be included in the vehicle 200. The compressor 206, turbine 208, turbine bypass valve 212, and compressor bypass valve 216 may be included in a control system, described in greater detail herein.

An exhaust gas recirculation (EGR) passage 218 may be coupled to the intake system 202 and the exhaust system 204. Specifically in the depicted embodiment, the EGR passage 218 may include a first port 220 coupled to the intake system 202 downstream of the compressor 206 and a second port 222 coupled to the exhaust system 204 downstream of the turbine 208. In other embodiments the second port may be positioned upstream of the turbine 208. This configuration may be referred to as high pressure EGR. A first heat-exchanger 226 may be coupled to the EGR passage. However, in other embodiments the first heat-exchanger 226 may be positioned in the intake system 202 upstream of the confluence of the EGR passage 218 and the intake system 202 and downstream of an engine intake heater such as fuel burner 230. The first heat-exchanger 226 may be configured to transfer heat from the gas flowing through the EGR passage to a coolant fluid. The coolant fluid may be the working fluid in a coolant loop, discussed in greater detail herein with regard to FIG. 3. The coolant loop may be directed to a variety of systems in the vehicle, such as a cabin climate control system and/or a powertrain lubrication system (e.g., a transmission and/or engine lubrication system). Therefore, heat may be transferred from the coolant fluid in the first heat-exchanger 226 to a cabin climate control system and/or a lubricant (e.g., engine oil, transmission fluid) in a powertrain lubrication system during engine warm up (such as before the engine coolant has been warmed via waste engine heat to a selected temperature). Further in some examples, heat from the first heat-exchanger 226 may be selectively transferred to the aforementioned systems.

A blower fan 228 may be fluidly coupled to the intake system 202 upstream of the fuel burner 230. In some examples, the blower fan may be included in a fuel vapor recovery system. The fuel vapor recovery system may be configured to sequester fuel vapor from a fuel delivery system 232 configured to provide fuel to combustion chamber in the engine 10. However in other embodiments the blower fan may not be included in a fuel vapor recovery system. An additional throttle may be placed upstream of the compressor to impede combusted air escaping out the intake system 202, in some embodiments, where the throttle may be adjusted (e.g., closed) based on the operation of the burner (e.g., whether the burner is operating, or not).

At least one emission control device 234 is positioned in the exhaust system downstream of the turbine 208 and the junction of the EGR passage 218 and the exhaust system 204. The emission control device 234 may be a catalyst, a filter, etc. Further in some embodiments the exhaust system may further include a particulate filter, a second catalyst, etc.

The intake system may further include a second heat-exchanger 236. The second heat-exchanger 236 may be positioned downstream of the compressor 206. Specifically, the second heat-exchanger 236 may be positioned downstream of the junction of the EGR passage 218 and the intake system 202. The second heat-exchanger 236 may be configured to transfer heat from the gas flowing through the intake system to a coolant fluid. The coolant fluid may be the working fluid in a coolant loop. The coolant loop may be directed to a variety of systems in the vehicle 200 such as a cabin climate control system, a powertrain lubrication system, etc. Therefore, heat may be transferred from the coolant fluid in the second heat-exchanger 236 to a cabin climate control system and/or powertrain lubrication system. It will be appreciated that the coolant fluid may be directed to a cabin heat-exchanger and/or a lubrication system heat-exchanger. The cabin heat-exchanger may be configured to transfer heat from the coolant fluid to the air circulated through the cabin. The lubrication system heat-exchanger may be configured to transfer heat from the coolant to an engine lubrication fluid such as engine oil, transmission fluid, etc during engine warm up (such as before the engine coolant has been warmed via waste engine heat to a selected temperature).

The second heat-exchanger 236 may also be configured to reduce the temperature of the intake air, which during warmed-up and boosted operating conditions (e.g., after coolant temperature is warmed via waste engine heat to a selected temperature, such as after the engine has warmed up following a cold start where the engine has cooled to ambient conditions) may be elevated via the compressor 206. In this way, the second heat-exchanger may be operated as an intercooler during certain operating conditions.

The intake system 202 may also include a throttle 237 positioned downstream of the second heat-exchanger 236, fuel burner 230, and the compressor 206. However in other examples, the throttle 237 may be positioned in another suitable location.

The fuel burner 230 may also be included in the intake system 202. The fuel burner 230 may be configured to combust fuel by burning an air/fuel mixture in the intake system 202, thereby generating heated gas. The fuel burner may include an ignition device 238 and a fuel delivery device 240 to perform said combustion. The fuel delivery device 240 may be configured to spray or otherwise deliver fuel into a combustion region adjacent to the ignition device. Specifically, the fuel delivery device may include a nozzle or other suitable component configured to atomize liquid fuel. In this way, combustion efficiency of the fuel burner may be increased. However in other examples the fuel provided by the fuel delivery device may be gas (e.g., fuel vapor, propane, etc.). The ignition device 238 may be operated to ignite a mixture of intake air drawn from the intake system 202 and atomized or vaporized fuel provided by the fuel delivery device 240.

The heated gas produced by combustion in the fuel burner 230 may be directed to downstream components in the intake system 202. In this way, heat may be efficiently generated in the intake system 202. Specifically in some examples, between 2 and 8 percent of the intake air flowing through the intake system 202 may be used for combustion in the fuel burner 230. However in other example, other amounts of air may be combusted via the fuel burner 230.

Further, in some embodiments, combustion in the fuel burner 230 may be pulsed at predetermined time interval to generate airflow within the intake system 202. This pulsing may also occur as a function of the combustion. The pressure increase due to combustion may drive the exhaust of the fuel burner downstream. Then the pressure rarefaction due to the inertial flow may open a check valve which may be included in the intake system, allowing more air to enter thus creating a cycle. In this way, the system acts as a pulse jet engine. Therefore, blower fan 228 may not be needed to generate airflow in the intake system when the engine 10 is not performing combustion in certain embodiments. Thus in some embodiments the blower fan 230 may not be included in the vehicle 200. Still further in some embodiments the fuel burner 230 may be supplied with over and/or under voltage protection.

The vehicle 200 may further include a fuel burner operational indicator 242. The fuel burner operational indicator 242 may inform an operator whether or not the fuel burner is combusting an air/fuel mixture. In some examples, the fuel provided to the fuel burner 230 may be obtained from the fuel delivery system 232. In this way, the fuel supplied to the fuel burner 230 and the engine 10 is supplied from a common source. In one particular example, the fuel may be taken from a fuel tank. In another example, fuel vapor may be extracted from the fuel delivery system 232.

The vehicle 200 may include controller 12, described above. The controller 12 may be included in a control system. The control system may further include the blower fan 228, the fuel burner 230, the compressor 206, the turbine 208, the turbine bypass valve 212, the compressor bypass valve, and the throttle 237.

The control system may be configured to implement a variety of control strategies for generating heat as well as reducing the temperature of gases in both the intake system 202 and the EGR passage 218. Specifically the control system may be configured to initiate generation of heated gas in the fuel burner 230 and flow the heated gas to the first heat-exchanger 226 and through the EGR passage 218 to the exhaust system 204, as further described herein.

In some examples the blower fan 228 may be operated to flow the heated gases to the first heat-exchanger 226. Additionally or alternatively the fuel burner 230 may be pulsed to flow the heated gases to the first heat-exchanger 226. It will be appreciated that the heated gas may flow to the first heat-exchanger 226 and through the EGR passage 218 to the exhaust system 204 during a first operating condition such as when the engine is not performing combustion cycles (such as during stopped engine operation). In this way, heat may be efficiently generated during stopped engine operation and provided to various vehicle systems. The control system may further be configured to transfer heat from the first heat-exchanger 226 to at least one of a cabin climate control system and a powertrain lubrication system. In this way, heat may be generated via the fuel burner provided to various vehicle systems prior to engine start-up. As a result, heat may be efficiently provided to a vehicle cabin, thereby enhancing the vehicle operator's comfort as well as providing various cabin heating functions (e.g., defrost, defog, etc.). Additionally, the control system may be configured to, during the first operating condition, direct heated gas from the first heat-exchanger 226 to the emission control device 234 and then to the atmosphere, thereby reducing emission generated via the fuel burner 230.

The control system may further be configured to initiate generation of heated gas in the fuel burner 230 and flow the heated gas to the second heat-exchanger 236 during a second operating condition different from the first operating condition. In some examples, the second operating condition may be an operating condition when combustion engine operation is occurring, but still before the engine has warmed up, or before coolant has reached a selected temperature. In this way, heat may be generated during start-up to decrease the duration of engine warm-up. As a result combustion efficiency in the engine may be increased and the viscosity of engine lubricant may be decreased thereby decreasing the likelihood of engine wear and reducing friction losses.

Further in some embodiments the control system may be configured to discontinue the fuel input to the fuel burner 230 when a predetermined time period has been reached and/or surpassed. In this way, when the ignition source in the fuel burner degrades, the likelihood of intake system and engine degradation caused by ignition of a fuel build up in the intake system may be reduced. Further, in some embodiments, the control system may be configured to initiate combustion in the fuel burner 230 to generate heated gas and flow the heated gas to the first heat-exchanger 226 in response to reception of a heating signal. The heating signal may be generated when a door in the vehicle is unlocked, when a key is placed in an ignition system, remote start, vehicle cabin pre-conditioning, etc. Further in some example, operation of the fuel burner 230 may be controlled based on one or more of the following parameters: engine coolant temperature, ambient air temperature, fuel level, power management in the vehicle, airbag deployment, etc.

In some embodiments certain vehicle operations (e.g., cabin heating/cooling) may be requested and/or preprogrammed via a vehicle operator. Specifically in some embodiments a user interface 250 may be provided to a vehicle operator to request and/or preprogram various vehicle operations. The user interface may be in wired and/or wireless communication with the controller 12. The user interface may for example include touch screen 252, knob 254, slider 256, or other suitable input devices, components, etc., enabling a vehicle operator to adjust certain vehicle operations. Specifically in some examples the user interface may be configured to generate a cabin heating strategy for the vehicle 200. The cabin heating strategy may include periods of desired cabin heating, cabin temperature set-points or set-point ranges, etc. In this way, a vehicle operator may program cabin heating within the vehicle according to their predilection. It will be appreciated that the cabin heating strategy may be implemented during shut-down periods when the engine is not performing combustion. However in other embodiments, cabin heating operation in the vehicle may be preprogrammed.

FIG. 3 shows a schematic depiction of the first heat-exchanger 226 and a vehicle system 300. The vehicle system may be a cabin climate control system, a powertrain lubrication system, an engine cooling system (e.g., coolant jacket), etc. It will be appreciated that coolant may travel between the first heat-exchanger 226 and the vehicle system 300, and optionally through an engine coolant jacket, radiator, etc. The vehicle system may include a third heat-exchanger 302. The third heat-exchanger may be configured to transfer heat from the coolant to another fluid (e.g., engine lubricant, air, coolant fluid in a coolant jacket, etc.). Further in some embodiments, the first heat-exchanger 226 may be fluidly coupled to a plurality of vehicle systems. Valves and pumps may be used to direct coolant to the plurality of vehicle systems based on the vehicle operating conditions. It will be appreciated that the second heat-exchanger 236 may be fluidly coupled to a vehicle system in a similar manner. Specifically in some embodiments the second heat-exchanger 236 may be fluidly coupled to the same vehicle system that the first heat-exchanger 226 is coupled to.

Figure 4:
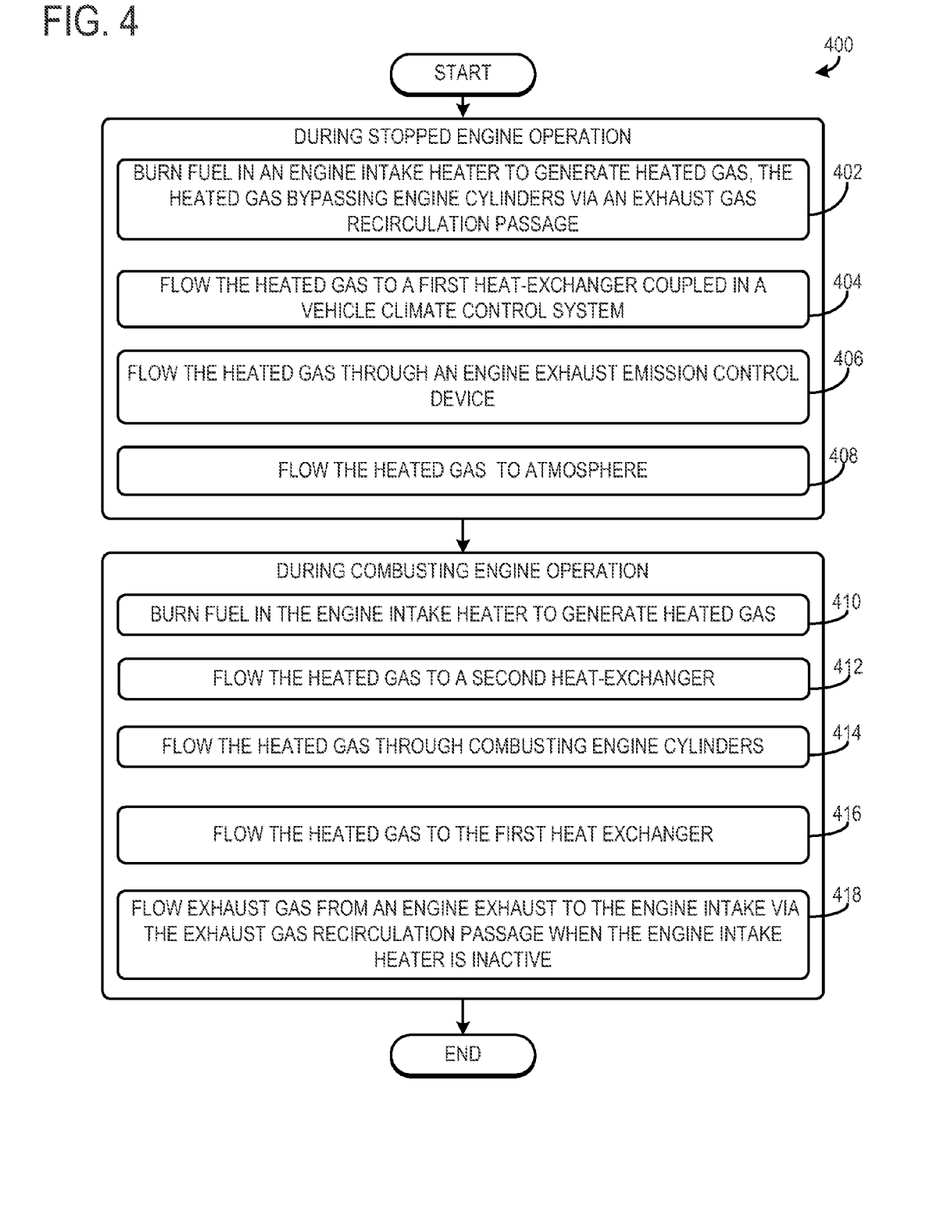
FIG. 4 shows a method for operation of a vehicle.

FIG. 4 shows a method 400 for operation of a vehicle. Method 400 may be implemented via the systems and components described above, in some embodiments. However in other embodiments method 400 may be implemented via other suitable systems and components.

Steps 402-408 are implemented during stopped engine operation. It will be appreciated that the engine does not perform combustion in the combustion chambers during stopped engine operation. At 402 the method includes burning fuel in an engine intake heater to generate heated gas, the heated gas bypassing engine cylinders via an exhaust gas recirculation passage. At 404 the method includes flowing the heated gas to a first heat-exchanger coupled in a vehicle climate control system. Specifically in some examples the first heat exchanger may be positioned in an EGR passage. Further in some embodiments it will be appreciated that the first heat exchanger may be coupled in the vehicle climate control system and/or a drivetrain lubrication system. At 406 the method includes flowing the heated gas through an engine exhaust emission control device. Next at 408 the method includes flowing the heated gas to the atmosphere.

Steps 410-416 are implemented during combustion engine operation. At 410 the method includes burning fuel in the engine intake heater to generate heated gas. At 412 the method includes flowing the heated gas to a second heat-exchanger. The second heat exchanger may be positioned in an intake system downstream of the confluence of an EGR conduit and the intake system. Furthermore, the second heat exchanger may be coupled in the vehicle climate control system and/or the drivetrain lubrication system. Next at 414 the method includes flowing the heated gas through combusting engine cylinders. At 416 the method includes flowing the heated gas to the first heat-exchanger. At 418 the method may include flowing exhaust gas from an engine exhaust to the engine intake via the exhaust gas recirculation passage when the engine intake heater is inactive. Method 400 may further include, in some embodiments, flowing a portion of the heated gas from the intake system to the exhaust system through the EGR passage. In this way, an emission control device (e.g., catalyst) positioned in the exhaust system downstream of the EGR conduit may be heated with the heated gas. As a result less air may pass through the engine, which may increase the engine's ability to act as a vacuum pump. A blower fan and/or pulse jet may be used to flow the heated air from the intake system to the exhaust system via the EGR conduit without passing first through the engine.

Figure 5:
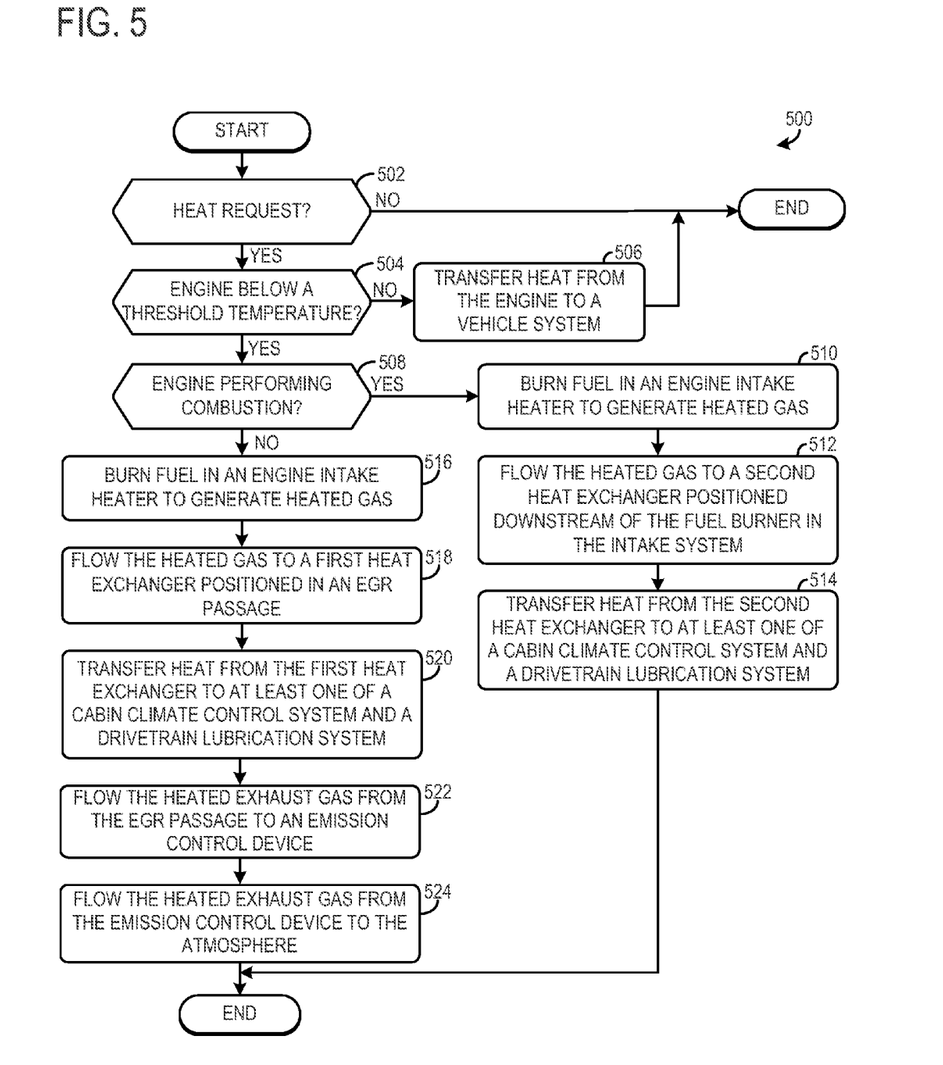
FIG. 5 shows another method for operation of a vehicle.

FIG. 5 shows a method 500 for operation of a vehicle. Method 500 may be implemented via the system and components described above in some embodiments. However in other embodiments method 500 may be implemented via another suitable system and components.

At 502 the method determines whether or not heat has been requested. The heat request may be generated based on an operating state of a vehicle system such as a cabin climate control system, a powertrain lubrication system, etc.

If it is determined that heat has not been requested (NO at 502) the method ends. However, if it is determined that heat has been requested (YES at 502) the method determines if the engine is below a threshold temperature at 504. In some examples the threshold temperature may correspond to the ambient temperature. If the engine is not below a threshold temperature (NO AT 504) the method includes at 506 transferring heat from the engine to a vehicle system. After 506 the method ends.

However, if the engine is below a threshold temperature (YES at 504) the method determines if the engine is performing combustion at 508. If it is determined that the engine is performing combustion (YES at 508) the method includes at 510 burning fuel in an engine intake heater to generate heated gas.

At 512 the method includes flowing the heated gas to a second heat-exchanger positioned downstream of the fuel burner in the intake system. Next at 514 the method includes transferring heat from the second heat-exchanger to at least one of a cabin climate control system and a powertrain lubrication system.

However if it is determined that the engine is not performing combustion cycles (NO at 508) the method includes at 516 burning fuel in an engine intake heater to generate heated gas. At 518 the method includes flowing the heated gas to a first heat-exchanger positioned in an EGR passage. Next at 520 the method includes transferring heat from the first heat-exchanger to at least one of a cabin climate control system and a powertrain lubrication system. At 522 the method includes flowing the heated exhaust gas from the EGR passage to an emission control device. At 524 the method includes flowing the heated exhaust gas from the emission control device to an exhaust system outlet.

It will be appreciated that the configurations and/or approaches described herein are exemplary in nature, and that these specific embodiments or examples are not to be considered in a limiting sense, because numerous variations are possible. The subject matter of the present disclosure includes all novel and nonobvious combinations and subcombinations of the various features, functions, acts, and/or properties disclosed herein, as well as any and all equivalents thereof.

The invention claimed is:

1. A method for an engine, comprising:
during stopped engine operation, burning fuel in an engine intake heater downstream of a compressor to generate heated gas, and flowing the heated gas through an exhaust gas recirculation (EGR) passage and then through a heat-exchanger to bypass engine cylinders and a turbine, while flowing coolant through the heat-exchanger to a vehicle climate control system; and
during combusting engine operation, burning fuel in the engine intake heater to generate the heated gas, and flowing the heated gas through combusting engine cylinders.

2. The method of claim 1, wherein the engine intake heater is a fuel-burning heater positioned in an engine intake duct.

3. The method of claim 2, wherein the heat-exchanger is positioned in the EGR passage.

4. The method of claim 1, further comprising, during stopped engine operation, flowing the heated gas to the heat-exchanger coupled to the vehicle climate control system, with coolant flowing through the heat-exchanger to a cabin heat-exchanger of the vehicle climate control system.

5. The method of claim 4, further comprising during combusting engine operation, flowing the heated gas to the heat-exchanger coupled in the vehicle climate control system.

6. The method of claim 1, further comprising during stopped engine operation, flowing the heated gas to the heat-exchanger coupled in the vehicle climate control system, and during combusting engine operation, flowing the heated gas to the heat-exchanger.

7. The method of claim 1, wherein the heat-exchanger comprises a first heat-exchanger, the method further comprising during stopped engine operation, flowing the heated gas to the first heat-exchanger coupled in the vehicle climate control system, and during combusting engine operation, flowing the heated gas to a second heat-exchanger coupled to an oil lubrication circuit.

8. The method of claim 1, further comprising during stopped engine operation, flowing the heated gas to the heat-exchanger coupled in the vehicle climate control system and positioned in the EGR passage, and then through an engine exhaust emission control device, and then to atmosphere, and during combusting engine operation, flowing the heated gas to a second heat-exchanger coupled in the vehicle climate control system.

9. The method of claim 1, wherein the engine intake heater includes a fuel burner supplied with fuel from a fuel delivery system included in the vehicle.

10. The method of claim 1, further comprising, during engine combusting conditions with the engine intake heater inactive, flowing exhaust gas from an engine exhaust to the engine intake via the EGR passage.

11. A vehicle comprising:
a fuel burner positioned in an intake system;
a heat-exchanger positioned downstream of the fuel burner;
an exhaust gas recirculation (EGR) passage fluidly coupling the intake system to an exhaust system downstream of a turbine; and
a control system configured to initiate generation of heated gas in the fuel burner and flow the heated gas to the heat-exchanger and through the EGR passage to the exhaust system, downstream of the turbine.

12. The vehicle of claim 11, wherein the heat-exchanger is positioned in the EGR passage.

13. The vehicle of claim 11, wherein the control system operates the fuel burner and flows the heated gas to the heat-exchanger when an engine of the vehicle is not performing combustion cycles.

14. The vehicle of claim 11, wherein the heat-exchanger comprises a first heat-exchanger, the vehicle further comprising a second heat-exchanger positioned in the intake system downstream of the fuel burner, wherein the control system is further configured to initiate generation of the heated gas in the fuel burner and flow the heated gas to the first heat-exchanger and through the EGR passage to the exhaust system to bypass the second heat-exchanger during a first operating condition, and to initiate generation of the heated gas in the fuel burner and flow the heated gas to the second heat-exchanger and then through an intake throttle during a second operating condition different from the first operating condition, and wherein during both the first and second operating conditions, the heated gas does not flow through an intake compressor.

15. The vehicle of claim 11, wherein the heat-exchanger is coupled to a cabin climate control system of the vehicle.

16. The vehicle of claim 11, wherein the heat-exchanger is coupled to a powertrain lubrication system.

17. The vehicle of claim 11, further comprising a compressor positioned upstream of the fuel burner and the turbine positioned in the exhaust system upstream of a confluence of the EGR passage and the exhaust system.

18. The vehicle of claim 11, further comprising an emission control device positioned downstream of a confluence of the EGR passage and the exhaust system.

19. The vehicle of claim 11, wherein fuel supplied to the fuel burner and an engine of the vehicle is supplied from a common source.

20. The vehicle of claim 11, further comprising a blower fan coupled to the intake system upstream of the fuel burner, the blower fan configured to flow air into the intake system while an engine of the vehicle is not performing combustion, and where the blower fan is coupled to a vapor recovery system.

21. A method for an engine, comprising: during stopped engine operation, burning fuel in an engine intake heater to generate heated gas, transferring heat from the heated gas to a coolant system via a first heat-exchanger, and flowing the heated gas through an exhaust gas recirculation (EGR) passage to bypass engine cylinders, the heated gas flowing through an exhaust gas recirculation (EGR) cooler; and during combusting engine operation, burning fuel in the engine intake heater to generate the heated gas, transferring heat from the heated gas to the coolant system via a second heat-exchanger, and flowing the heated gas through combusting engine cylinders, the heated gas flowing through an intake system intercooler and bypassing the EGR cooler, the engine being a boosted engine.

* * * * *